United States Patent [19]

Nagai

[11] Patent Number: 4,922,778
[45] Date of Patent: May 8, 1990

[54] APPARATUS FOR CUTTING METAL SHEET

[75] Inventor: Kiyonori Nagai, Tokyo, Japan

[73] Assignee: Sky Aluminum Co., Ltd., Tokyo, Japan

[21] Appl. No.: 258,562

[22] Filed: Oct. 17, 1988

[30] Foreign Application Priority Data

Oct. 16, 1987 [JP] Japan .................. 62-261244
Oct. 19, 1987 [JP] Japan .................. 62-263333
Oct. 19, 1987 [JP] Japan .................. 62-263334

[51] Int. Cl.$^5$ .................. B23D 19/04; B26D 1/24
[52] U.S. Cl. .................. 83/501; 83/344; 83/503; 83/508.2
[58] Field of Search .................. 83/344, 501, 502, 503, 83/498, 499, 500, 506, 508.2

[56] References Cited

U.S. PATENT DOCUMENTS

| 620,944 | 3/1899 | Mather | 83/501 |
|---|---|---|---|
| 1,985,856 | 12/1934 | Evans | 83/503 |
| 2,706,524 | 4/1955 | Hall | 83/503 |
| 3,364,803 | 1/1968 | Senftleben | 83/503 |
| 3,545,326 | 12/1970 | Madachy | 83/503 |
| 3,566,725 | 3/1971 | Sutyak | 83/503 |
| 3,603,190 | 9/1971 | Kollen | 83/503 |
| 3,691,810 | 9/1972 | Tadeusz | 83/344 |
| 3,863,537 | 2/1975 | Huelsman | 83/503 |
| 4,380,945 | 4/1983 | Guild et al. | 83/503 |
| 4,781,095 | 11/1988 | Yoshida | 83/502 |

FOREIGN PATENT DOCUMENTS

| 189952 | 8/1986 | European Pat. Off. | 83/499 |
|---|---|---|---|
| 859428 | 12/1940 | France | 83/502 |

Primary Examiner—Frank T. Yost
Assistant Examiner—Scott A. Smith
Attorney, Agent, or Firm—Darby & Darby

[57] ABSTRACT

In an apparatus for cutting a metal sheet, a pair of hollow shafts are mounted in a housing for angular movement relative thereto. The hollow shafts have respective hollow bores whose respective axes are eccentric to the axes of the respective hollow shafts. A pair of holder shafts are rotatably fitted respectively in the hollow bores. A pair of circular cutting blades are mounted respectively on projecting forward ends of the respective holder shafts in concentric relation thereto for rotation with the respective hollow shafts. When the holder shafts are rotated to rotate the cutter blades, the cutter blades cooperate with each other to cut a metal sheet caused to pass between the cutter blades. An interlocking unit is arranged between the hollow shafts, for enabling the hollow shafts to be moved angularly about their respective axes in an interlocking fashion, thereby moving the axes of the respective holder shafts toward and away from each other to adjust an amount of lap between the cutting blades.

15 Claims, 9 Drawing Sheets

APPARATUS FOR CUTTING METAL SHEET

BACKGROUND OF THE INVENTION

The present invention relates to an apparatus for cutting a metal sheet. More specifically, the present invention relates to such an apparatus as a slitter, a side-trimmer or the like suitably used for cutting an elongated metal sheet along the length thereof.

FIGS. 1 and 2 show a conventional side-trimmer for cutting a metal sheet or a metal sheet. The side-trimmer comprises a pair of cutter heads 1 (only one of the two heads is shown) which are arranged symmetrically to each other with respect to a vertical plane of symmetry CL of the side-trimmer. The pair of cutter heads 1 are mounted on a table 2 for linear sliding movement toward and away from each other in such a manner that horizontal distance between the cutter heads 1 is adjusted to cut off the opposite side edges of the metal sheet for dimensionning the sheet to a predetermined width. The metal sheet to be trimmed passes horizontally in a transit plane PL, so that a center line of the sheet generally coincides with the plane of symmetry CL.

Each of the cutter heads 1 includes a pair of upper and lower holder shafts 3 and 4 which are arranged perpendicular to the plane of symmetry CL and in parallel relation to each other in a vertical plane. A pair of upper and lower circular cutting blades 5 and 6 are detachably mounted to the forward ends of the holder shafts 3 and 4 for rotation therewith, the forward ends being on the side of the plane of symmetry CL. The cutting blades 5 and 6 are so disposed that the uppermost point of the lower cutting blade 6 comes slightly higher than the lowermost point of the upper cutting blade 5 and a surface of the lower cutting blade 6 opposite to the plane of symmetry CL and a surface of the upper cutting blade 5 facing to the plane of symmetry CL is generally in a same plane parallel to the plane of symmetry CL. When the holder shafts 3 and 4 are driven rotatively, the cutting blades 5 and 6 are rotated and cooperate with each other to cut the side edge of the metal sheet passing therebetween. In this manner, side-trimming of a metal sheet or a metal sheet is carried out.

Holder section 3a and 4a are formed on the forward ends of the respective upper and lower holder shafts 3 and 4. The cutting blades 5 and 6 are fitted respectively on the holder sections 3a and 4a of the upper and lower holder shafts 3 and 4. A nut-type fastener 7 is threadedly engaged with the forward end of the upper holder shaft 3 to tightly clamp the upper cutting blade 5 between the fastener 7 and a reference surface 3b. The reference surface 3b is formed on the holder section 3a perpendicular to an axis of the holder shaft 3. Likewise, the lower cutting blade 6 is tightly clamped between a nut-type fastener 8 and a reference surface 4b of the lower holder section 4a.

The upper holder shaft 3 is rotatably supported by an upper chock 9 through a pair of axially spaced tapered roller bearings 9a and 9a. The upper chock 9 is mounted to an upper portion of the cutter head 1 for vertical sliding movement. Likewise, the lower holder shaft 4 is rotatably supported by a lower chock 10 through a pair of axially spaced tapered roller bearings 10a and 10a. The lower chock 10 is mounted to a lower portion of the cutter head 1 for vertical sliding movement. A gap adjusting bolt 11, extending vertically, is connected to an upper portion of the upper chock 9 in threadedly engaged relation thereto. A worm shaft 12 is in mesh with a worm wheel (not shown) which is mounted to the gap adjusting bolt 11 for rotation therewith. The arrangement is such that when the worm shaft 12 is rotatively driven, the upper chock 9 is moved vertically, making it possible to adjust the amount of vertical gap between the upper and lower cutting blades 5 and 6 which are mounted, respectively, to the upper and lower holder shafts 3 and 4.

That is, when it is desired to adjust the amount of vertical gap between the upper and lower cutting blades 5 and 6 in each of both the cutter heads 1 (only one shown) in compliance with the thickness of the metal sheet to be side-trimmed, a rotary shaft 13 extending between upper portions of the respective cutter heads 1 is rotated by a wheel 13a, whereby the mounts of vertical lap in the respective cutter heads 1 are adjusted simultaneously. Specifically, when the rotary shaft 13 is rotatively driven by the wheel 13a, rotation of the rotary shaft 13 is transmitted to the worm shaft 12 through a chain 14. The gap adjusting bolt 11 is rotatively driven through the worm wheel in mesh with the worm shaft 12, so that the upper chock 9 is moved vertically. On the other hand, a vertical position adjusting wedge 15 is arranged below the lower chock 10. When a wedge drive screw 16 arranged horizontally is rotated by a wheel 16a, the wedge 15 is moved in a direction perpendicular to the transit direction of the metal sheet, i.e., toward and away from the plane of symmetry CL. This causes the lower chock 10 to be moved vertically. The vertical positions of the respective upper and lower cutting blades 5 and 6 are adjusted in the following manner. That is, the amount of downward adjustment of the upper cutting blade 5 and the amount of upward adjustment of the lower cutting blade 6 are made equal to each other. The transit plane of the metal sheet is brought to a position where the amount of vertical gap between the upper and lower cutting blades 5 and 6 is divided into two equal distances. Specifically, the transit plane of the metal sheet is brought to the vertical position of the pass plane PL. In other words, if the upper and lower cutting blades 5 and 6 are equal in diameter to each other, the vertical distance between the pass plane PL and the upper holder shaft 3 is made equal to that between the pass plane PL and the lower holder shaft 4, so that the transit plane of the metal sheet is brought into coincidence with the pass plane PL.

The side-trimmer further comprises a drive system for rotatively driving the upper and lower holder shafts 3 and 4. The drive system includes a drive shaft 17 arranged at the same level as the lower holder shaft 4 in parallel relation thereto, as shown in FIG. 2. A drive gear 19 is mounted on the drive shaft 17 for rotation therewith. The drive gear 19 is in mesh with a driven gear 18 which is mounted on the lower holder shaft 4 for rotation therewith and which is arranged within the lower chock 10 substantially at an axial center thereof. Rotation of the drive shaft 17 is transmitted to the lower holder shaft 4 directly through the gears 19 and 18. On the other hand, the gear 19 is in mesh with an intermediate gear 19a which, in turn, is in mesh with a driven gear 20. The driven gear 20 is mounted on the upper holder shaft 3 for rotation therewith and is arranged within the upper chock 9 substantially at an axial center thereof. Rotation of the drive shaft 17 is transmitted to the holder shaft 3 through the gears 19, 19a and 20. In this manner, the upper and lower holder shafts 3 and 4 are rotatively driven by the drive shaft 17 at equal rotational speed. The side edge of the metal sheet is caused to pass between the upper and lower cutting blades 5 and 6 which are rotated respectively by the holder shafts 3 and 4, whereby the side edge of the metal sheet is cut by the upper and lower cutting blades 5 and 6. In the manner described above, the side-trimming is carried out with respect to the opposite side edges of the metal sheet by the pair of cutter heads 1.

In the above conventional side-trimmer, when it is desired to increase the amount of vertical gap between the upper and lower cutting blades 5 and 6 in compliance with the thickness of the metal sheet, the upper chock 9 supporting the upper holder shaft 3, having mounted thereto the upper cutting blade 5, is first moved downward by a distance half of the desired amount of vertical gap. Subsequently, the lower chock 10 supporting the lower holder shaft 4, having mounted thereto the lower cutting blade 6, is moved upwardly by the distance half of the desired amount of vertical gap, so as to bring the pass plane PL of the side-trimmer into coincidence with the transit plane of the metal sheet. In this manner, it is required for the conventional side-trimmer to adjust the vertical positions of the respective holder shafts 3 and 4 independently of each other, in order to adjust the amount of vertical gap between the upper and lower cutting blades 5 and 6.

Conventional side-trimmers have problems and inconveniences which will be explained as follows.

It is required that the cut surface of the metal sheet is as flat and smooth as possible in order to avoid cracking and fissuring of the metal sheet during subsequent processes. If the cut surface is not enough flat and smooth, fissuring and cracking occur in the metal sheet during subsequent operations such as rolling, other plastic forming etc and the fissure and cracks may expand to break the metal sheet. For that, the metal sheet have to be shear-cut by the cutting blades. On the contrary, the metal sheet must not be ruptured. Further, it is desirable to minimize plastic deformation remaining on the cut edge of the metal sheet. In order to realize the above-mentioned cutting of the metal sheet, it is required that the cutting blades has a most flat cutting plane and that the cutting blades are retained so that the cutting plane are exactly coincident with a plane when they are assembled in the side-trimmer. A problem as to conventional side-trimmers are that they do not have such exactitude in cutting metal sheets because of the gaps and inexactitudes residing inevitably therein. The cause of the inexactitudes exists, for example, in the mechanism for adjusting the vertical gap, mechanism for holding the cutting blades, mechanism for holding the holder shafts, etc. which will be explained in more detail later.

In the conventional side-trimmer, the upper and lower chocks 9 and 10 are arranged for vertical sliding movement relative to a housing 1a in order to adjust the amount of vertical lap between the upper and lower cutting blades 5 and 6. Accordingly, clearances exist between the upper and lower clocks 9 and 10 and the housing 1a in order to enable the sliding movement of the upper and lower chocks 9 and 10 at the adjustment of the amount of vertical gap. Because of such clearance, it is difficult to raise the accuracy of the degree of parallelism between the upper and lower holder shafts 3 and 4 and the degree of perpendicularly of the upper and lower holder shafts 3 and 4 with respect to the plane of symmetry CL. Moreover, since the upper chock 9 is moved vertically by the gap adjusting bolt 11 to adjust the amount of vertical gap between the upper and lower cutting blades 5 and 6, backlash of the gap adjusting bolt 11 causes errors, resulting in a deterioration of the accuracy in the adjustment of the amount of vertical gap.

One of the other problems is that the adjusting operation is elaborating, even not being sufficiently exact and takes a considerable time for the adjusting operation.

The above-described side-trimmer comprising the pair of upper and lower cutting blades 5 and 6 has conventionally been employed as a metal sheet cutting apparatus capable of obtaining a mirror-like high cut dimension accuracy. In the metal sheet cutting apparatus of the kind referred to above, cutting is performed with the pair of upper and lower cutting blades 5 and 6 set in such a manner that a predetermined horizontal gap is defined between the upper and lower cutting blades 5 and 6 in accordance with the thickness of the metal sheet to be cut. Because of such arrangement, a cut surface of the metal sheet consists of a shear surface section formed on, for example, 50% of the sheet thickness and a broken surface section formed on the remaining 50% of the sheet thickness. In the conventional apparatus so designed as to be suitable for the cutting operation under such condition, the cut dimension accuracy is of the order of 2/100 to 5/100 mm in error, even in case where the accuracy is good.

On the other hand, an increase in uses of the metal sheet material has produced a necessity of cutting at a cut dimension accuracy within a range of from 2/100 to 3/1000 mm in error. In recent years, a demand from the user has increased for supply of the metal sheet material cut at such high accuracy.

It is impossible for the conventional cutting apparatus in which the broken surface section is formed on a part of the cut surface, however, to achieve the cutting at the high accuracy within the range of from 2/1000 to 3/1000 mm in error. It is required for the cutting at such high accuracy to cut the metal sheet material such that the cut surface consists of a shear surface section formed substantially on 100% of the sheet thickness, and a broken surface section is not almost formed on the cut surface. For this purpose, it is a necessary minimum condition that the amount of horizontal gap between the rotating upper and lower cutting blades 5 and 6 is brought close to 0 (zero) mm as far as possible.

In the conventional metal sheet cutting apparatus such as, for example, the side-trimmer described above, each of the circular upper and lower cutting blades 5 and 6 is fixedly mounted to a corresponding one of the holder shafts 3 and 4 in such a manner that the one end face of the cutting blade 5 or 6 is abutted against the vertical holder reference surface 3b or 4b formed on the holder section 3a or 4a of the holder shaft 3 or 4, thereby obtaining the requisite degree of perpendicularity of the cutting blade 5 or 6 with respect to the holder shaft 3 or 4. Specifically, as described previously, the nut-type fasteners 7 and 8 are threadedly engaged respectively with the male threads formed on the forward ends of the respective holder shafts 3 and 4. The one end faces of the respective upper and lower cutting blades 5 and 6 are abutted respectively against the holder reference surfaces 3b and 4b, thereby fixing the upper and lower cutting blades 5 and 6. Accordingly, it is inevitable that each of the nut-type fasteners 7 and 8 urges a corresponding one of the upper and lower cutting blades 5 and 6 against a corresponding one of the holder reference surfaces 3b and 4b in an inclined posture of the nut-type fastener 7 or 8 because of the lead angle and the backlash of the male threads formed on the holder shaft 3 or 4. Thus, a part of the end face of the upper or lower cutting blade 5 or 6 is abutted against the holder reference surface 3b or 4b so that the each cutting blade 5 or 6 is fastened in an inclined fashion. As a result, the requisite degree of perpendicularity of the upper and lower cutting blades 5 and 6 with respect to the respective holder shafts 3 and 4 cannot be obtained.

Since the upper and lower cutting blades 5 and 6 are fastened in a slightly inclined fashion with respect to the respective holder shafts 3 and 4, run-out occurs in each of the upper and lower cutting blades 5 and 6, when the holder shafts 3 and 4 are rotated. Accordingly, unless an appropriate horizontal gap is left between the upper and lower cutting blades 5 and 6, they interfere with each other, resulting in such an anxiety that the cutting blades are broken or are brought to a state incapable of rotation. Thus, it is impossible to set the amount of horizontal gap to 0 mm.

Further, in case where the upper and lower cutting blades 5 and 6 are fastened in an inclined fashion with respect to the respective holder shafts 3 and 4, run-out occurs when the upper and lower cutting blades 5 and 6 are rotated. This run-out results in an error of the cut dimension.

Moreover, as described previously, the clearances are defined between the upper and lower chocks 9 and 10 and housing 1a, in order to enable the sliding movement of the upper and lower chocks 9 and 10 at the adjustment of the amount of vertical lap between the upper and lower cutting blades 5 and 6. Accordingly, the upper and lower chocks 9 and 10 are rickety, because of the clearances, so that deviation occurs in the parallelism and the vertical alignment between the upper and lower holder shafts 3 and 4 in the vertical plane. As a consequence, it is required for the upper and lower cutting blades 5 and 6 to have an appropriate horizontal gap therebetween, in order to avoid the interference between the upper and lower cutting blades 5 and 6.

Furthermore, in the conventional metal sheet cutting apparatus such as the side-trimmer as described above, the upper and lower holder shafts 3 and 4 are rotatively driven in the following manner. That is, the driven gears 18 and 20 are mounted respectively on the holder shafts 3 and 4 for rotation therewith. The drive shaft 17 having mounted thereon the drive gear 19 is arranged within the same housing 1a. Rotation of the drive shaft 17 is transmitted directly or indirectly to both the driven gears 18 and 20, thereby rotatively driving the holder shafts 3 and 4. In such arrangement, a load is applied from the rotating drive gear 19 and intermediate gear 19a to the driven gears 18 and 20 at running of the cutting apparatus, so that deflection occurs in each of the upper and lower holder shafts 3 and 4. As a result, the degree of perpendicularity of each of the upper and lower cutting blades 5 and 6 with respect to the axis of a corresponding one of the holder shafts 3 and 4 varies. Thus, it is required for the upper and lower cutting blades 5 and 6 to have an appropriate amount of horizontal gap therebetween, in order to eliminate interference between the upper and lower cutting blades 5 and 6.

Further, in the conventional metal sheet cutting apparatus such as the side-trimmer described above, each of the holder shafts 3 and 4 is supported rotatably in such a manner that the radial load and the thrust load acting upon the holder shaft 3 or 4 are born by the tapered roller bearings 9a or 10a which are large in play in the thrust direction. Accordingly, when the load is applied to the rotating upper and lower cutting blades 5 and 6 at cutting of the metal sheet, the upper and lower cutting blades 5 and 6 tend to move away from each other. Thus, the holder shafts 3 and 4 axially move independently of each other within the range of the thrust play of the tapered roller bearings 9a and 10a, so that the amount of horizontal gap between the upper and lower cutting blades 5 and 6 is varied. Thus, even if the amount of horizontal gap is adjusted and set beforehand to 0 mm, the horizontal gap is enlarged at the cutting of the metal sheet.

Moreover, because of the aforesaid clearances between the upper and lower chocks 9 and 10 and the housing a, the load acting upon the upper and lower cutting blades 5 and 6 at the running of the side-trimmer causes the holder shafts 3 and 4 to be moved axially. Thus, each of the upper and lower chocks 9 and 10 is urged axially and is moved axially within the range of the amount of clearance. As a result, the horizontal gap between the upper and lower cutting blades 5 and 6 is further enlarged.

Furthermore, in case where the upper and lower cutting blades 5 and 6 are fastened in such a manner that the upper and lower cutting blades are slightly inclined with respect to the respective holder shafts 3 and 4 as described previously, deviation occurs in each of the upper and lower cutting blades 5 and 6 when they are rotated. The deviation results in an error in the cut dimension.

SUMMARY OF THE INVENTION

It is an object of the invention to provide an apparatus for cutting a metal sheet, the apparatus being capable of securing a requisite degree of perpendicularity of each of a pair of circular cutting blades with respect to an axis of a corresponding one of a pair of holder shafts, whereby an amount of gap between the cutting blades is brought close to 0 (zero) mm as far as possible, enabling the metal sheet to be cut at high accuracy in which a shear cut surface is formed on substantially 100% of a cut surface of the metal sheet.

It is still another object of the invention to provide an apparatus for cutting a metal sheet in which an axial play of each of a pair of holder shafts is eliminated whereby an amount of gap between a pair of cutting blades is brought close to 0 (zero) mm as far as possible, enabling the metal sheet to be cut at high accuracy in which a sheared surfaces is formed on substantially 100% of a cut surface of the metal sheet.

It is an object of the invention to provide an apparatus for cutting a metal sheet capable of adjusting an amount of lap between a pair of circular cutting blades easily, for a short period of time and at high accuracy.

According to the invention, there is provided an apparatus for cutting a metal sheet, the apparatus essentially composed of a pair of hollow shafts having respective axes extending in spaced parallel relation to each other, the hollow shafts being supported for angular movement about their respective axes, the hollow shafts having respective hollow bores whose respective axes being eccentric to the axes of the respective hollow shafts; a pair of holder shafts fitted in the hollow bores of the respective hollow shafts for rotation relative thereto, the holder shafts having respective one ends projecting from the hollow shafts; drive means associated with the other ends of the respective holder shafts for rotating the holder shafts about their respective axes; a pair of circular cutting blades mounted on said one ends of the respective holder shafts in concentric relation thereto for rotation therewith, the cutter blades being adaptable for cooperating with each other so as to cut a metal sheet caused to pass therebetween; and interlocking means for angularly moving the hollow shafts about their respective axes in an interlocking fashion, thereby moving the respective axes of the holder shafts toward and away from each other to adjust an amount of lap between the cutting blades.

DETAILED DESCRIPTION OF THE PREFERRED EMBODIMENTS

The invention will be described hereinafter in detail with reference to the accompanying drawings.

Figure 2:
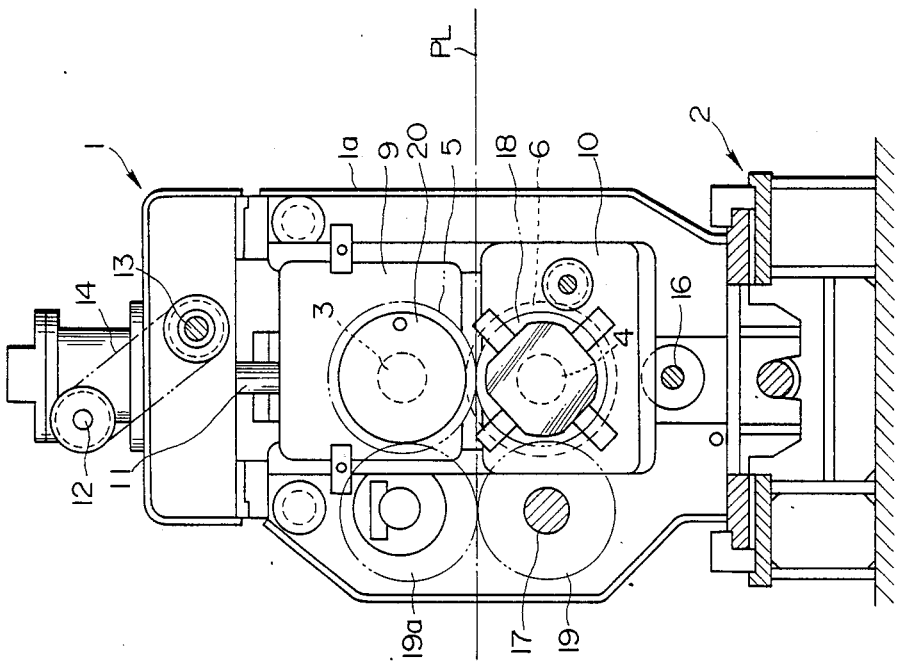
FIG. 2 is a cross-sectional view taken along the line II—II in FIG. 1.
Figure 1:
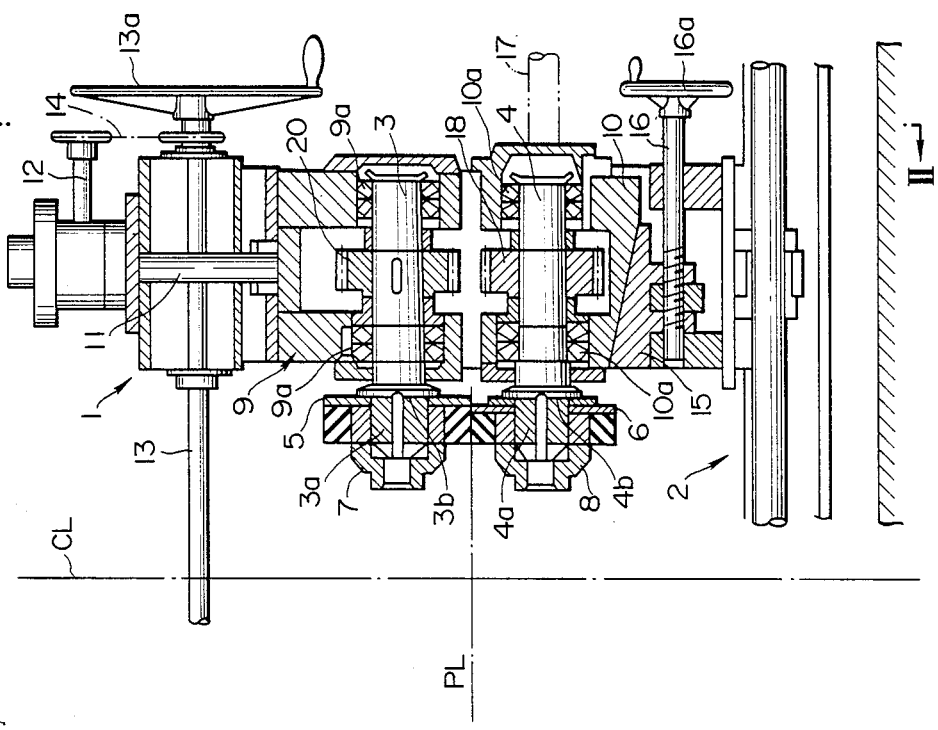
FIG. 1 is a vertical cross-sectional view of a conventional side-trimmer.
Figure 3:
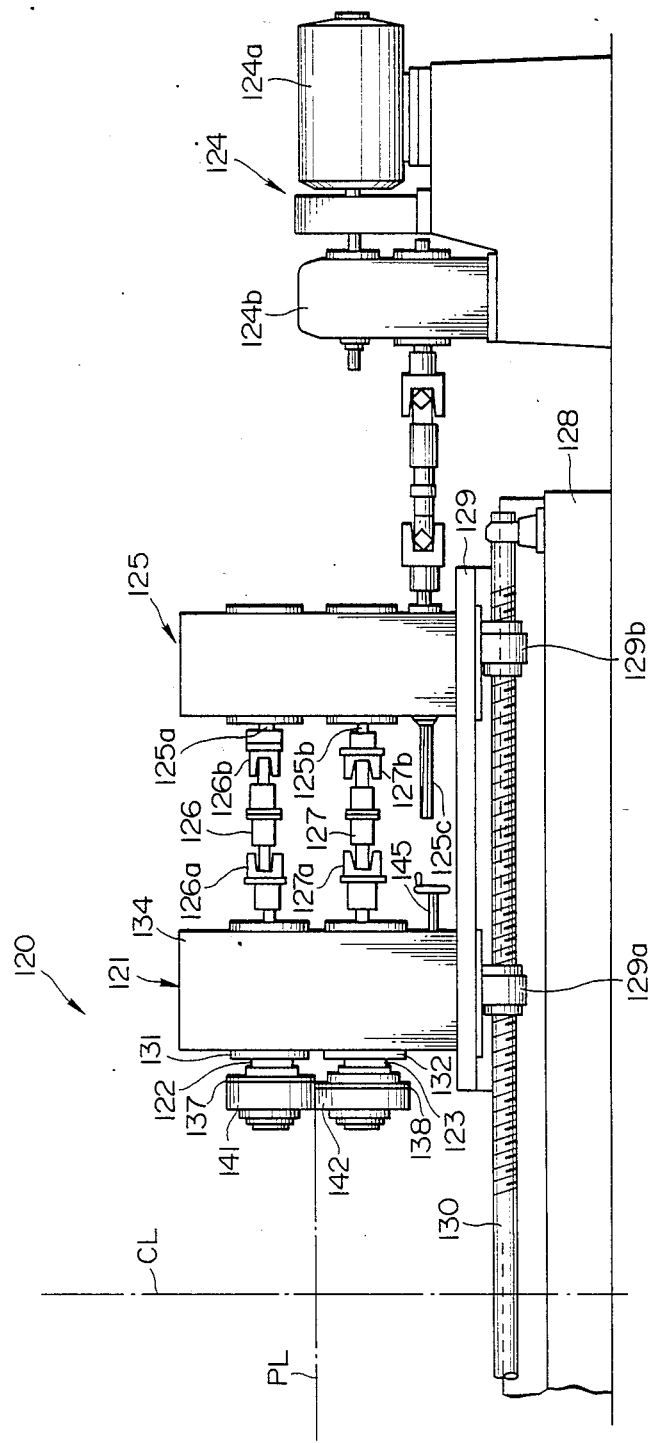
FIG. 3 is a fragmentary front elevational view of a side-trimmer according to an embodiment of the invention, the side-trimmer comprising a pair of cutter heads one of which is omitted from illustration.

Referring first to FIGS. 3 through 9, in particular, to FIG. 3, there is shown an apparatus for cutting a metal sheet according to an embodiment of the invention, which is applied to a side-trimmer 120. The side-trimmer 120 comprises a pair of right- and left-hand cutter heads 121 which are arranged in symmetric relation to a vertical plane containing a plane of symmetry CL of the side-trimmer 120 and which extending perpendicularly to a pass plane PL through which a metal sheet to be cut passes. The right- and left-hand cutter heads 121 are the same in construction as each other, and the left-hand cutter head is therefore omitted from illustration in FIG. 3. Only the right-hand cutting head 121 will be described below.

The cutter head 121 includes a housing 134, and a pair of upper and lower holder shafts 122 and 123 which are rotatably supported in the housing 134. The upper and lower holder shafts 122 and 123 extend horizontally and are arranged in a vertical plane in parallel relation to each other. A drive unit 124 has a motor 124a whose rotation is transmitted to an input shaft 125c of a camwaltz 125 through a reduction gear 124b. The camwaltz 125 is arranged between the cutter head 121 and the drive unit 124 and is so designed as to distribute rotational driving force transmitted to the input shaft 125c, equally to a pair of output shafts 125a and 125b. The upper and lower holder shafts 122 and 123 have their respective rearward ends remote from the plane of symmetry CL. The rearward end of the upper holder shaft 122 is connected to one end of a transmission shaft 126 through a synchronous joint 126a. The other end of the transmission shaft 126 is connected to the input shaft 125a through a synchronous joint 126b. Likewise, the rearward end of the lower holder shaft 122 is connected to the output shaft 125b through a synchronous joint 127a, a transmission shaft 127 and a synchronous joint 127b. Rotation from the motor 124a is distributed equally to the pair of output shafts 125a and 125b of the camwaltz 125. The synchronous joints 126a and 126b or 127a and 127b associated with each of the transmission shafts 126 and 127 can absorb axial displacement of a corresponding one of the upper and lower holder shafts 122 and 123 due to adjustment of an amount of vertical gap between a pair of upper and lower circular cutting blades 137 and 138 subsequently to be described. The upper and lower holder shafts 122 and 123 arc rotatively driven respectively by the output shafts 125a and 125b through the respective transmission shafts 126 and 127, separately from or independently of each other. In this manner, it is possible for the arrangement of the side-trimmer 120 to prevent bending moment from being applied to each holder shaft to avoid deflection occurring in each holder shaft, unlike the conventional apparatus of such as the side-trimmer described previously in which rotation of one of the pair of holder shafts is transmitted to the other holder shaft through the gear arrangement.

The cutter head 121 and the camwaltz 125 are mounted on a carriage 129 which is arranged for movement in a direction perpendicular to a transport direction of the metal sheet along rails (not shown) on a table 128. A pair of feed nuts 129a and 129b are fixedly mounted to a lower surface of the carriage 129. The feed nuts 129a and 129b are threadedly engaged with a feed screw shaft 130. The feed screw shaft 130 has a right-hand end portion formed with left-hand threads, and a left-hand end portion (not shown) formed with right-hand threads, as viewed in FIG. 3. The feed nuts 129a and 129b are threadedly engaged with the right-hand end portion of the feed screw shaft 130. The arrangement is such that when the feed screw shaft 130 is rotated in the normal or reverse direction, the carriage 129 is moved toward or away from the plane of symmetry CL. Thus, the pair of right- and left-hand cutter heads 121 are moved toward and away from each other, thereby making it possible to adjust the width of the metal sheet to be side-trimmed.

Figure 4:
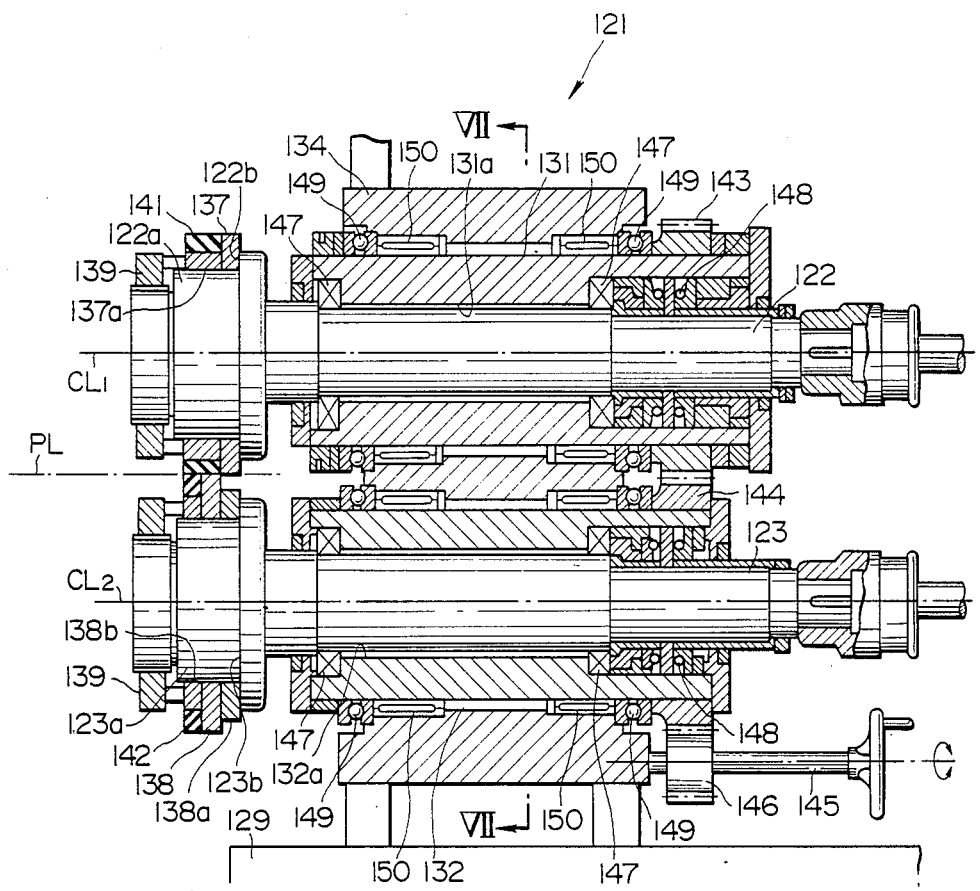
FIG. 4 is a vertical cross-sectional view of the cutter head illustrated in FIG. 3.
Figure 5:
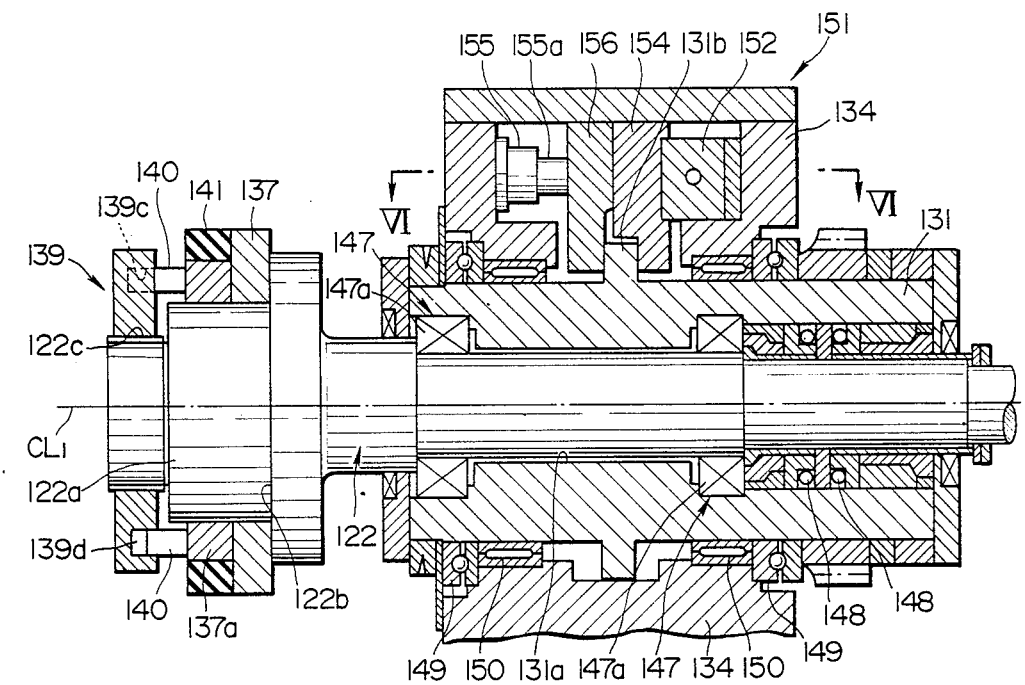
FIG. 5 is a somewhat enlarged fragmentary vertical cross-sectional view showing in detail a horizontal gap adjusting mechanism illustrated in FIG. 4.

As shown in detail in FIGS. 4 and 5, a pair of upper and lower cylindrical hollow shafts 131 and 132 are arranged in the housing 134 of the cutter head 121 in symmetric relation to the transit plane of the metal sheet containing the pass plane PL. The upper and lower hollow shafts 131 and 132 are the same in outer diameter to each other, and have their respective hollow bores 131a and 132a which are the same in diameter to each other. Axes of the respective hollow bores 131a and 132a are eccentric respectively to axes $CL_1$ and $CL_2$ of the upper and lower hollow shafts 131 and 132. The axis of each of the hollow bores 131a and 132a is eccentric, by a predetermined amount, to the axis of a corresponding one of the hollow shafts 131 and 132. The upper and lower holder shafts 122 and 123 are rotatably fitted respectively in the hollow bores 131a and 132a in the respective upper and lower hollow shafts 131 and 132. A longitudinally intermediate portion of the upper holder shaft 122 is rotatably supported by a pair of axially space ball bearings 147 and 147 whose respective inner races are shrink fitted to the holder shaft 122 and respective outer races 147a (see FIG. 5) are fixedly mounted to the upper hollow shaft 131. Thrust load acting upon the upper holder shaft 122 is borne by the ball bearings 147 and 147. The rearward end of the upper holder shaft 122 is rotatably supported by a pair of angular thrust ball bearings 148 and 148 such that movement of the upper holder shaft 122 in the thrust direction is restricted by the bearings 148 and 148. Likewise, a longitudinally intermediate portion of the lower holder shaft 123 is rotatably supported by a pair of axially spaced ball bearings 147 and 147, and the rearward end of the lower holder shaft 123 is rotatably supported by a pair of angular thrust ball bearings 148 and 148.

The upper hollow shaft 131 is supported by the housing 134 rotatably through a pair of axially spaced thrust ball bearings 149 and 149 and a pair of axially spaced needle bearings 150 and 150 such that thrust load acting upon the upper hollow shaft 131 is born by the ball bearings 149 and 149, and radial load acting upon the upper hollow shaft 131 is born by the needle bearings 150 and 150. Likewise, the lower hollow shaft 131 is supported by the housing 134 rotatably through a pair of thrust ball bearings 149 and 149 and a pair of needle bearings 150 and 150.

As described above, each of the holder shafts 122 and 123 and the hollow shafts 131 and 132 is supported such that the radial load and the thrust load acting upon the shaft are borne independently of each other. This makes it possible to eliminate a play in the thrust direction, unlike the case where the thrust load and the radial load are borne simultaneously by the tapered roller bearings. In particular, in each of the upper and lower hollow shafts 131 and 132, the radial load is borne by the pair of needle bearings 150 and 150, thereby restraining a play in the radial direction of each hollow shaft 131 or 132 with respect to the housing 134 to a minimum value.

Figure 6:
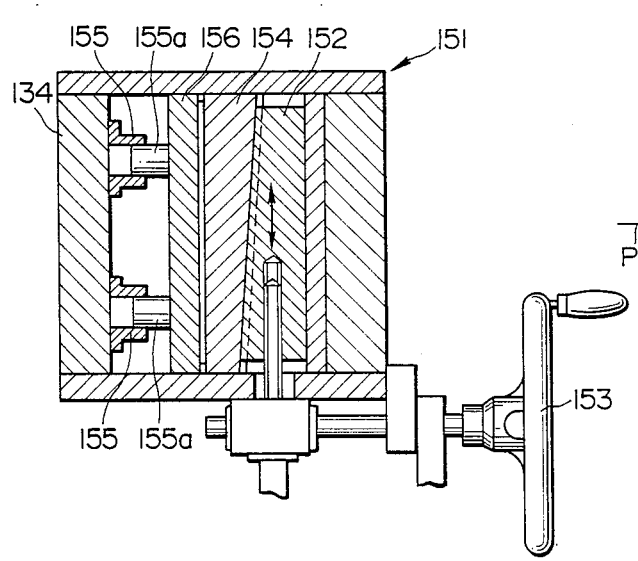
FIG. 6 is an enlarged fragmentary cross-sectional view taken along the line VI—VI in FIG. 5.

The upper hollow shaft 131 is arranged in the cutter head 121 for axial movement relative to the housing 134. A horizontal-gap adjusting mechanism 151 is arranged on an upper portion of the housing 134, for moving the upper hollow shaft 131 axially to adjust an amount of horizontal gap between the upper and lower circular cutting blades 137 and 138, as shown in FIGS. 5 and 6.

The horizontal-gap adjusting mechanism 151 comprises a gap adjusting wedge member 152 for urging the upper hollow shaft 131 axially to position the same. The wedge member 152 is drivingly connected to an adjusting wheel 153 arranged on the outside of the housing 134. When the adjusting wheel 153 is rotated, the wedge member 152 is moved forwardly upwardly as viewed in FIG. 6) or rearwardly in a direction perpendicular to the axis $CL_1$ of the upper hollow shaft 131 in such a manner that one end face of the wedge member 152 is in sliding contact with an inner surface of an upper right-hand side wall portion of the housing 134. For example, when the gap adjusting wedge member 152 is moved forwardly, the wedge member 152 urges a right-hand end face of a flange-like annular projection 131b formed on the outer periphery of the substantially central section of the upper hollow shaft 131, through a first urging plate 154, to alter the position of the upper hollow shaft 131 relative to the housing 134 to the left as viewed in FIG. 5.

A pair of hydraulic cylinders 155 and 155 are arranged on the inside of an upper left-hand side wall portion of the housing 134 in parallel relation to the axis $CL_1$ of the upper hollow shaft 131. The hydraulic cylinders 155 and 155 are connected to a hydraulic-pressure generating source (not shown) through a hydraulic circuit (not shown) formed in the side wall of the housing 134. The hydraulic cylinders 155 and 155 have their respective rams 155a and 155a whose respective forward ends are abutted against one end face of a second urging plate 156. The hydraulic cylinders 155 and 155 are so arranged as to urge the left-hand end face of the annular projection 131b on the upper hollow shaft 131 through the second urging plate 156. When the amount of horizontal gap between the upper and lower cutting blades 137 and 138 is adjusted by the wedge member 152, relatively low hydraulic pressure is supplied to the hydraulic cylinders 155 and 155. The relatively low hydraulic pressure urges the upper hollow shaft 131 to the right as viewed in FIG. 5 through the second urging plate 156, thereby enabling the horizontal gap between the upper and lower cutting blades 137 and 138 to be adjusted by the wedge member 152. When the wedge member 152 is moved rearwardly, the upper hollow shaft 131 is urged to the right as viewed in FIG. 5, to bring the wedge member 152, the first urging plate 154 and the annular projection 131b into close contact with each other, thereby eliminating the axial play. After completion of the adjustment of the horizontal gap, high hydraulic pressure is supplied to the hydraulic cylinders 155 and 155 to urge the second urging plate 156 toward the wedge member 152, thereby clamping the annular projection 131b between the first and second urging plates 154 and 156 to completely restrict the axial movement of the upper hollow shaft 131.

Thus, at the adjustment of the horizontal gap, the resilient biasing force of the hydraulic cylinders 155 and 155, which is relatively low in pressure, enables the horizontal gap between the upper and lower cutting blades 137 and 138 to be adjusted at high accuracy without the axial play. After the adjustment of the horizontal gap, the restriction against the axial movement by the high pressure from the hydraulic cylinders 155 and 155 enables an appropriate amount of gap to be set between the upper and lower cutting blades 137 and 138 of the respective upper and lower holder shafts 122 and 123 fitted respectively in the upper and lower hollow shafts 131 and 132. Further, even when force is applied to the upper and lower cutting blades 137 and 138 in such a direction as to move them away from each other at cutting of the metal sheet, the predetermined amount of horizontal gap set beforehand between the upper and lower cutting blades 137 and 138 by the gap adjusting mechanism 151 is maintained unchanged during cutting of the metal sheet, because the upper and lower holder shafts 122 and 123 and the upper and lower hollow shafts 131 and 132 are restricted in their respective axial movement. By this reason, once the amount of horizontal gap between the upper and lower cutting blades 137 and 138 is set to 0 mm, the amount of horizontal gap is kept constant during the cutting of the metal sheet, thereby enabling cutting at high accuracy in which virtually 100% of the cut surface of the metal sheet is brought to a shear cut surface.

In the illustrated embodiment, the gap adjusting mechanism 151 employs the pair of hydraulic cylinders 155 and 155 as urging means. However, another urging means may be employed such as springs, air cylinders or the like.

Figure 7:
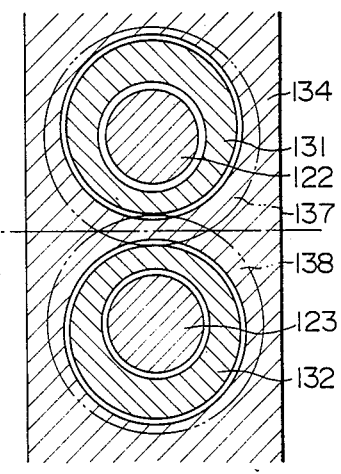
FIG. 7 is a fragmentary cross-sectional view taken along the line VII—VII in FIG. 4.

As described previously, the upper and lower hollow shafts 131 and 132, in which the upper and lower holder shafts 122 and 123 are respectively fitted rotatably, extend perpendicularly to the transport direction of the metal sheet. The axes $CL_1$ and $CL_2$ of the respective upper and lower hollow shafts 131 and 132 extend in parallel relation to each other. The upper and lower hollow shafts 131 and 132 are arranged in such a posture that the upper and lower hollow shafts 131 and 132 are symmetric to the pass plane PL. Specifically, the upper and lower hollow shafts 131 and 132 are arranged in the housing 134 of the cutter head 121 in such a manner that, as shown in FIG. 7, radial or vertical cross-sectional configurations of the respective upper and lower hollow shafts 131 and 132 are symmetric to the pass plane PL.

The upper and lower holder shafts 122 and 123 have their respective forward end portions which extend respectively from the upper and lower hollow shafts 131 and 132 toward the plane of symmetry CL. The forward end portions of the respective upper and lower holder shafts 122 and 123 are formed respectively with holder sections 122a and 123a which are larger in diameter than the remaining portions of the respective upper and lower holder shafts 122 and 123. The holder sections 122a and 123a are formed respectively with flanges on the side of the upper and lower hollow shafts 131 and 132. The flanges have their respective one end faces remote from the hollow shafts 131 and 132. The one end faces are formed respectively with holder reference surfaces 122b and 123b which extend perpendicularly to the axes $CL_1$ and $CL_2$ of the respective hollow shafts 131 and 132. The upper annular cutting blade 137 is fitted about the holder section 122a and is abutted against the holder reference surface 122b. On the other hand, the lower annular cutting blade 138 is fitted about the holder section 123a and is abutted against the holder reference surface 123b through an annular spacer 138a which is equal in thickness to the upper cutting blade 137. The upper and lower cutting blades 137 and 138 are so arranged that the amount of horizontal gap between the upper and lower cutting blades 137 and 138 are brought substantially to 0 (zero) mm as described previously. A pair of upper and lower fasteners 139 and 139 are threadedly engaged respectively with the forward ends of the upper and lower holder shafts 122 and 123. The upper fastener 139 urges the upper cutting blade 137 against the holder reference surface 122b through a fixing ring 137a, thereby fixing the upper cutting blade 137 in position. On the other hand, the lower fastener 139 urges the lower cutting blade 138 against the holder reference surface 123b through a fixing ring 138b and the spacer 138a, thereby fixing the lower cutting blade 138 in position.

Figure 8:
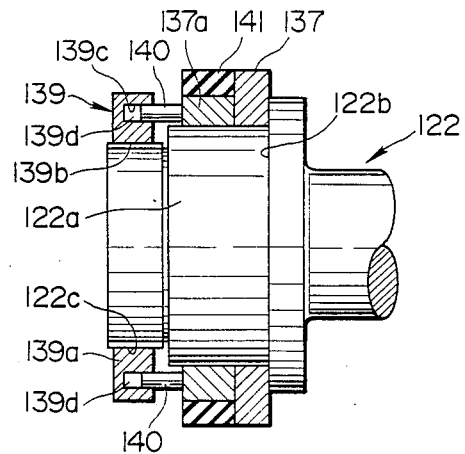
FIG. 8 is an enlarged fragmentary view of an upper fastener illustrated in FIGS. 4 and 5.
Figure 9:
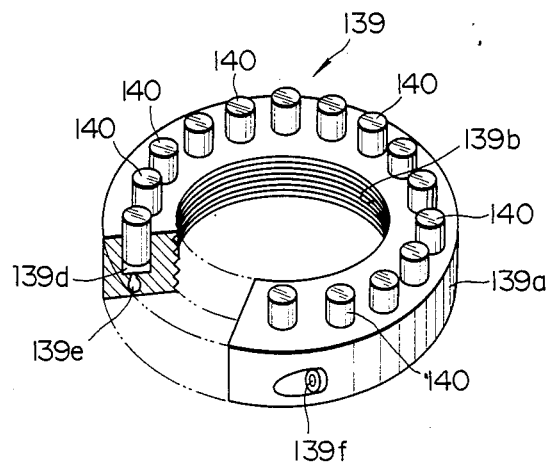
FIG. 9 is a perspective view of the fastener illustrated in FIG. 8.

The upper and lower fasteners 139 and 139 are the same in construction to each other, and only the upper fastener 139 will be described in detail with reference to FIGS. 8 and 9. That is, the fastener 139 has a cylindrical base 139a whose inner peripheral surface is formed with female threads 139b. The female threads 139b are threadedly engaged with male threads 122c on the outer periphery of the forward and of the holder section 122a. A plurality of circular bores 139c are formed in one end face of the cylindrical base 139a or a right-hand end face thereof as viewed in FIG. 8, in circumferentially equidistantly spaced relation to each other. A plurality of plungers 140 each serving as an urging element have their respective base ends which are fitted respectively in the circular bores 139c slidably and in a liquid-tight manner. Hydraulic chambers 139d are defined respectively between the base end faces of the respective plungers 140 and the bottom surfaces of the respective circular bores 139c. The hydraulic chambers 139c communicate with each other through a communication bore 139e in such a manner that hydraulic pressure is supplied to each of the hydraulic chambers 139c from a hydraulic pressure generating source (not shown) through the communication bore 139e. The hydraulic pressure supplied to each hydraulic chamber 139d can easily be adjusted by turning movement of a hydraulic pressure regulating bolt 139f whose head is arranged at the outer peripheral surface of the base 139a. The hydraulic pressure generated at the source is supplied to the hydraulic chambers 139 at equal pressure.

When the upper and lower fasteners 139 and 139 are threadedly engaged respectively with the forward ends of the respective holder sections 122a and 123a, and the hydraulic pressure regulating bolts the respective fasteners 139 and 139 are turned to raise the hydraulic pressure, the plungers 140 of each of the fasteners 139 and 139 are pushed at equal pressure to urge the end face of a corresponding one of the fixing rings 137a and 138b at a plurality of circumferential locations. The one end faces of the respective cutting blades 137 and 138 are brought into close contact respectively with the vertical holder reference surfaces 122b and 123b of the upper and lower holder shafts 122 and 123, so that the cutting blades 137 and 138 are vertically mounted respectively to the holder shafts 122 and 123.

Further, a pair of feed rolls 141 and 142 are fitted respectively about the fixing rings 137a and 138b. The pair of feed rolls 141 and 142 cooperate with each other to elastically clamp therebetween the metal sheet at the cutting thereof. Thus, the pair of feed rolls 141 and 142 prevent the metal sheet from slipping, to ensure that the metal sheet is fed in synchronism with the cutting speed.

As shown in FIG. 4, a pair of upper and lower annular gears 143 and 144 are mounted respectively to the rearward ends of the respective hollow shafts 131 and 132 for angular movement therewith about their respective axes $CL_1$ and $CL_2$. The upper and lower annular gears 143 and 144 are in mesh with each other and are the same in diameter and number of gear teeth as each other. The lower annular gear 144 is in mesh with a drive gear 146 which is mounted to a vertical-lap adjusting wheel shaft 145 for rotation therewith. The vertical-lap adjusting wheel shaft 145 is arranged at the lower portion of the housing 134 in parallel relation to the upper and lower holder shafts 122 and 123. When the wheel shaft 145 is rotated, the upper and lower hollow shafts 131 and 132 are moved angularly about their respective axes $CL_1$ and $CL_2$ through the annular gears 144 and 143, whereby the amount of vertical lap between the upper and lower cutting blades 137 and 138 can be adjusted.

The amount of vertical lap between the upper and lower cutting blades 137 and 138 is adjusted in compliance with the thickness of the metal sheet to be side-trimmed, in the following manner. That is, when the vertical-lap adjusting wheel shaft 145 is rotated in, for example, the clockwise direction, the drive gear 146 mounted on the wheel shaft 145 moves the lower hollow shaft 132 angularly about its axis $CL_2$ in the counterclockwise direction through the annular gear 144. At the same time, the upper hollow shaft 31 is moved, through the annular gear 143 in mesh with the annular gear 144, angularly about the axis $CL_1$ in the opposite direction or in the clockwise direction by an amount of angular movement equal to that of the lower hollow shaft 132. When the upper and lower hollow shafts 131 and 132 are moved angularly about their respective axes $CL_1$ and $CL_2$ in their respective directions opposite to each other, the axes of the respective upper and lower holder shafts 122 and 123 fitted respectively in the eccentric bores 131a and 132a in the upper and lower hollow shafts 131 and 132 are moved toward and away from each other depending upon the respective directions in which the upper and lower hollow shafts 131 and 32 are moved angularly about their respective axes $CL_1$ and $CL_2$. When the upper and lower holder shafts 122 and 123 are moved toward each other, the upper and lower cutting blades 37 and 138 fixedly mounted vertically respectively on the upper and lower holder shafts 122 and 123 move simultaneously in such a direction as to increase the amount of vertical lap between the upper and lower cutting blades 137 and 138 with reference to the pass plane PL. That is, the upper cutting blade 137 moves downwardly, while the lower cutting blade 138 moves upwardly. Conversely, when the upper and lower holder shafts 122 and 123 are moved away from each other, the upper and lower cutting blades 137 and 138 move simultaneously in such a direction as to decrease the amount of vertical lap between the upper and lower cutting blades 137 and 138 with reference to the pass plane PL. That is, the upper cutting blade 137 moves upwardly, while the lower cutting blade 138 moves downwardly. Thus, the amount of vertical lap between the upper and lower cutting blades 137 and 138 is adjusted while the pass plane PL is maintained unchanged. After the amount of vertical lap has been adjusted in compliance with the thickness of the metal sheet in the manner described above, each of the gears 143, 144 and 146 is locked against rotation by a lock mechanism associated with any one of the drive gear 146 on the lap adjusting wheel shaft 145 and the annular gears 143 and 144 on the respective upper and lower hollow shafts 131 and 132. Thus, the side-trimming operation is carried out, with the upper and lower hollow shafts 131 and 132 locked against rotation so that the amount of vertical lap after the adjustment is maintained unchanged.

In the embodiment described above, each of the upper and lower hollow shafts 131 and 132, in which the upper and lower holder shafts 122 and 123 are fitted respectively, is supported by the housing 134 rotatably through the needle bearings 150 having minimum radial play. This makes it possible to eliminate ricketiness of the upper and lower holder shafts 122 and 123. Further, the camwaltz 125 is arranged independently of the cutter head 121 in such a manner that the rotational force from the drive unit 124 is once distributed at equal speed to the pair of output shafts 125a and 125b at the camwaltz 125. Thereafter, the upper and lower holder shafts 122 and 123 are rotatively driven respectively by the output shaft 125a and 125b. With such arrangement, it is possible to prevent the upper and lower holder shafts 122 and 123 from being deflected, unlike the conventional arrangement in which rotation of the drive shaft is transmitted directly to the upper and lower holder shafts through the gears. Accordingly, the relative positional relationship between the upper and lower cutting blades 137 and 138 mounted vertically respectively to the upper and lower holder shafts 122 and 123 does not change even during the running of the side-trimmer, so that the perpendicularity of each cutting blade can be maintained at high accuracy. Thus, even if the amount of horizontal gap between the upper and lower cutting blades 137 and 138 is brought substantially to 0 mm, it is possible to prevent the upper and lower cutting blades 137 and 138 from interfering with each other.

Further, the arrangement of the embodiment is such that the radial load acting upon each holder shaft 122 or 123 is received by the pair of ball bearings 147 and 147, while the thrust load acting upon the holder shaft is received by the pair of angular thrust ball bearings 148 and 148. With such arrangement, it is possible to eliminate a play in the radial and thrust directions of the holder shaft, unlike the conventional arrangement in which both the radial load and the thrust load are received by the tapered roller bearings.

Moreover, in the embodiment, the upper and lower cutting blades 137 and 138 are fixed respectively onto the upper and lower holder shafts 122 and 123 by means of the respective fasteners 139 and 139 each comprising the plurality of plungers 140 arranged in circumferentially equidistantly spaced relation to each other. The upper and lower cutting blades 137 and 138 are fixed in their respective positions such that the one end faces of the respective blades are brought into close contact respectively with the holder reference surfaces 122b and 123b. Thus, the upper and lower cutting blades 137 and 138 can be mounted vertically respectively to the upper and lower holder shafts 122 and 123, making it possible to prevent deviation of each cutting blade during rotation thereof.

Figure 10:
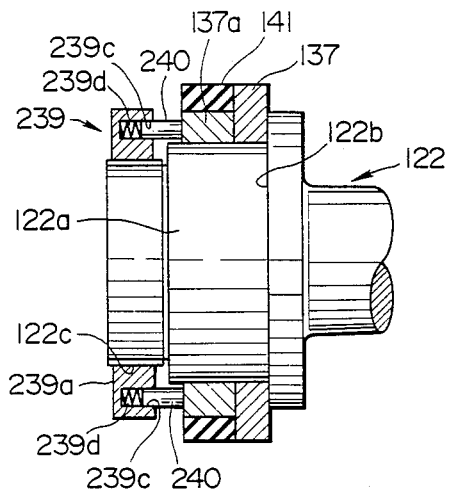
FIG. 10 is a view similar to FIG. 8, but showing a modification of the fastener.
Figure 11:
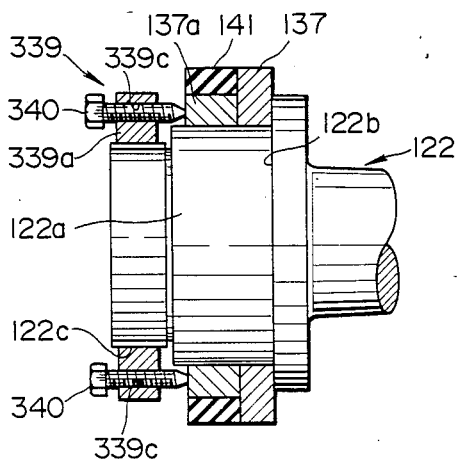
FIG. 11 is a view similar to FIG. 8, but showing another modification of the fastener.

. FIGS. 10 and 11 show respectively first and second modifications of the fastener 139 illustrated in FIGS. 8 and 9 In FIGS. 10 and 11, components and parts like or similar to those shown in FIGS. 8 and 9 are designated by the same or like reference numerals, and the description of these like or similar components and parts will therefore be omitted to avoid repetition. It is to be noted that although FIGS. 10 and 11 show the fastener mounted to the upper holder shaft 122, the fastener is the same in construction as the fastener mounted to the lower holder shaft.

Referring to FIG. 10, the fastener 239 according to the first modification is of spring type and has a cylindrical base 239a. A plurality of circular bores 239c are formed in one end face of the cylindrical base 239a or a right-hand end face thereof as viewed in FIG. 10 in circumferentially equidistantly spaced relation to each other. A plurality of plungers 240 each serving as an urging element have their respective base ends which are slidably fitted respectively in the circular bores 239c. A plurality of strong coil springs 239d are interposed under compression respectively between the base end faces of the respective plungers 240 and the bottom surfaces of the respective circular bores 239c. The plungers 240 are always biased outwardly or to the right as viewed in FIG. 10 under biasing forces of the respective springs 239c. When the fastener 239 is threadedly engaged with the forward end of the holder section 122a, the plurality of plungers 240 of the fastener 239 urge the end face of the fixing ring 137a at a plurality of locations simultaneously. The upper cutting blade 137 urged through the fixing ring 137a is fixed vertically in such a manner that the one end face of the upper cutting blade 137 is brought into close contact with the holder reference surface 122b of the holder section 122a.

Accordingly, if the upper and lower cutting blades 137 and 138 are fixedly fastened respectively to the holder sections 122a and 123a by the use of the fasteners 249 constructed as above, there can be obtained functional advantages substantially similar to those of the embodiment described previously.

FIG. 11 shows the fastener 339 of screw type according to the second modification. A plurality of threaded bores 339c are formed through a cylindrical base 339a in circumferentially equidistantly spaced relation to each Other. A plurality of urging bolts 340 are threadedly engaged respectively with the threaded bores 339c in such a manner that forward ends of the respective urging bolts 340 project respectively from the threaded bores 339c. The fastener 339 is threadedly engaged with the forward end of the holder section 122a and, subsequently, the urging bolts 340 are turned at predetermined torque by a torque wrench or the like. The plurality of urging bolts 340 of the fastener 339 urge the end face of the fixing ring 137a at a plurality of locations at equal force. The upper cutting blade 137 urged through the fixing ring 137a is fixed vertically in such a manner that the one end face of the upper cutting blade 137 or the right-hand end face thereof as viewed in FIG. 11 is brought into close contact with the holder reference surface 122b of the holder section 122a.

Accordingly, if the upper and lower cutting blades 137 and 138 are fixedly fastened respectively to the holder sections 122a and 123a by the use of the fasteners 339 constructed as above, there can be obtained functional advantages substantially similar to those of the embodiment described previously.

The invention has been described as being applied to the side-trimmer. But, the invention is equally applicable to another metal sheet cutting apparatuses such as a slitter and the like as described as follows.

Figure 12:
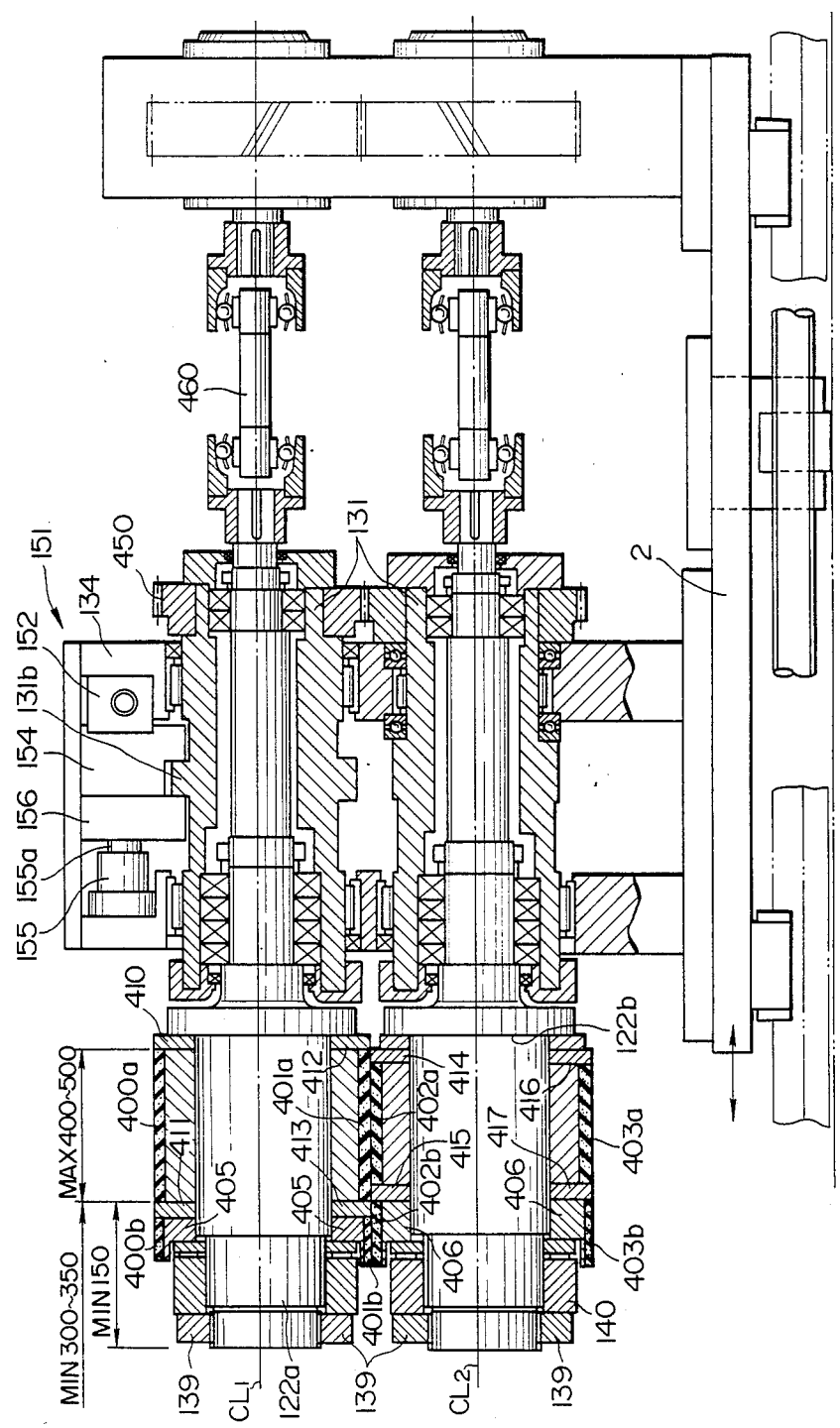
FIG. 12 shows a modified embodiment of the present invention applied to a slitter.

FIG. 12 shows another embodiment of the present invention that is a slitter. Construction as regards the drive unit 460, the distributor means, the cutter head 151 are similar to the above-mentioned embodiments. The differences exist in the constructions of the holder section of the holder shaft, the cutting blades and the fasteners. Taking the upper holder shaft and upper cutting blades 410, 411 for example, the characteristic portion of the embodiment is explained as follows. The upper holder shaft projects out of the upper hollow shaft largely and the diameter of the projecting portion decreases steppingly from the hollow shaft-side to the distal end. A cutting blade 410 is disposed around an intermediate portion in close contact with a side planar surface of a portion having the largest diameter. An inner member 400a is also disposed around the intermediate portion so that one end thereof is in also contact with the cutting blade 410. As the other end of the inner sleeve 400a, another cutting blade 411 is disposed, the blade 411 being identical to the cutting blade 410 except that it is disposed left side right with respect to the other. An outer sleeve member 400a, made of a resilient material and having a length identical to that of the inner sleeve member, is disposed around the inner sleeve member. Thus, the cutting blade 410, 411 are retained parallel to each other perpendicular to the axis of the holder shaft. The distance between the blades 410 and 411 is determined by the sleeve member so as to be identical to the length thereof. To the other side of the cutting blade 411, a secondary inner sleeve member 405 and a secondary outer sleeve member 400b are disposed, one end thereof being in close contact, respectively, to a planar surface of the cutting blade 411. The other planar surface of the secondary inner sleeve member 405 is retained by a retainer ring which is trusted by a ring 139 attached at an end of the holder shaft, through retaining means similar to the preceding embodiments.

Disposition of the cutting blades 414, 415 at the lower holding shaft is identical to that of the above case except that the lengths of the first and second sleeve members are different from the former case. More precisely, the first inner sleeve member is shorter in the the lower holder shaft compared to the upper holder shaft so that outer side surfaces of the respective lower cutting blades are disposed to come in contact with respective inner side surfaces of the respective upper cutting blades. The outer sleeve members 401a, 401b, 402a, 402b are made of resilient material.

A metal sheet passing through the pass line is cut at two locations, that is, an intersection with a plane passing between the cutting blades 402 and 414, and an intersection with plane passing between the cutting blades 413 and 415. Resiliency of the outer sleeve members permit a lap of the cutting blades by deforming convexedly when the cutting blades press thereon. By passing a metal sheet through the pass line, 5 slits of the metal sheet is obtained. Two of them are generally narrow strips at both respective edges of the metal sheet, outside of the cutter blade 414 and a cutter blade disposed symmetrically thereto (not shown) with respect to the plane of symmetry. Next pair of metal slits are slitted by means of cutting blades 412, 414 and 413, 415, and cutting blades disposed symmetrically thereto (not shown). The last one is slitted out by the cutting edges 413, 415 and cutting blades disposed symmetrically thereto.

Figure 13:
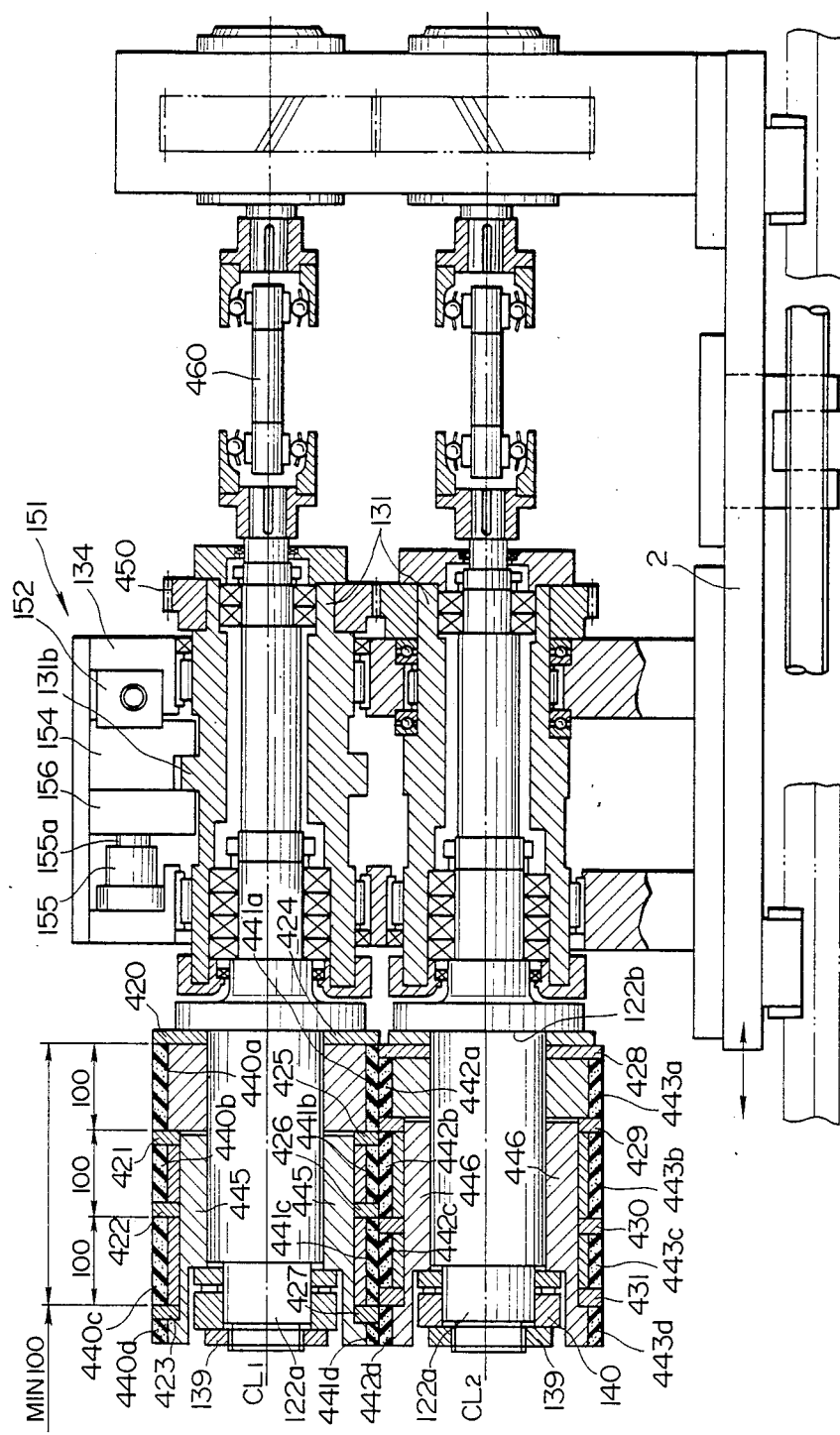
FIG. 13 shows a further modified embodiment of the present invention also applied to a slitter.

FIG. 13 shows another modified embodiment of the present invention. The embodiment differs from the above embodiment in that four cutting blades are disposed on each of the holder shafts. On the upper holder shaft, there is provided cutting blades 420, 421, 422, 423. On the lower holder shaft, there is provided cutting blades 428, 429, 430, 431. Between the cutting blades 420 and 421, an inner sleeve member and an outer sleeve member 440a are provided so as to retain the cutting blades 420, 421 perpendicular to the axis of the holder shaft and to give a predetermined distance therebetween. A cylindrical member 445 is disposed around the holder shaft and in contact at one end thereof with an end of the inner sleeve element. The cutting blades 421, 422 and 423 are disposed around the cylindrical member 445. Inner sleeve members and outer sleeve members 440b, 440c and 440d are disposed around the cylindrical member 445 between each pair of the adjacent cutting blades 421, 422 and 440. The lower holder means and the cutting blades 428, 429, 430 and 431 have an identical construction as the above-mentioned upper holder shaft and the cutting blades except that the distance between adjacent cutting blades are different from the above case so that the cutting edges of respective upper and lower cutting blades are disposed in respective cutting plane. By virtue of the embodiment as described above, a metal sheet is slitted into 9 slits or strips.

In the above descriptions, number and disposition of the cutter blades are symmetrical with respect to the plane of symmetry CL. But, there is no need to restrict the construction as symmetric but the number of cutting blades and their disposition can be non-symmetric.

Figure 14:
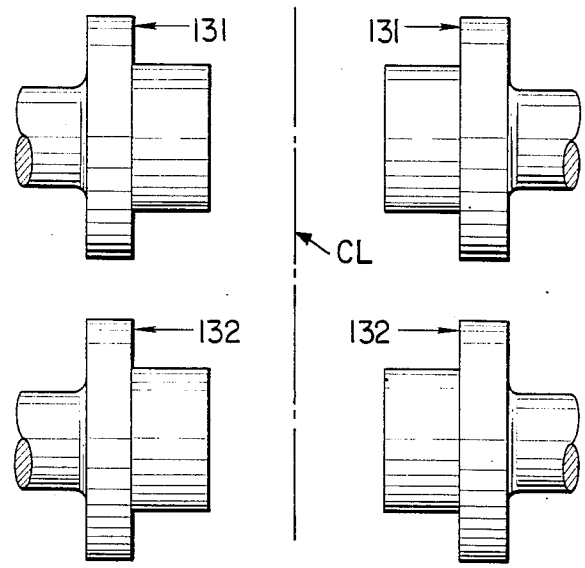
FIG. 14 is a sketch of a portion of holder shafts.

FIG. 14 shows a portion of a holder shaft including a reference surface on which a cutting blade is press fitted by retaining means. As previously described, exactitude of the reference plane, that is, a difference from an imaginary plane perpendicular to the axis of the holder shaft, is crucial in obtaining an exact manufacturing. Therefore, the exactitude of the reference plane, as assembled together with the apparatus for cutting a metal sheet as invented, is measured. The measurement was performed as to four reference surfaces, namely, that of upper and lower holder shafts and that of upper and lower holder shafts disposed symmetrically thereto. Following table 1 shows a maximum deviation of the reference surface from an ideal plane. The maximum deviation is in the order of several microns, 5.5 $\mu$m at maximum, which is extremely smaller than conventional apparatus of the kind wherein the deviation is between 30 to 70 $\mu$m even when they are assembled as exactly as possible. The drastic decrease of the error is realized by the improvement according to the present invention.

Figure 15:
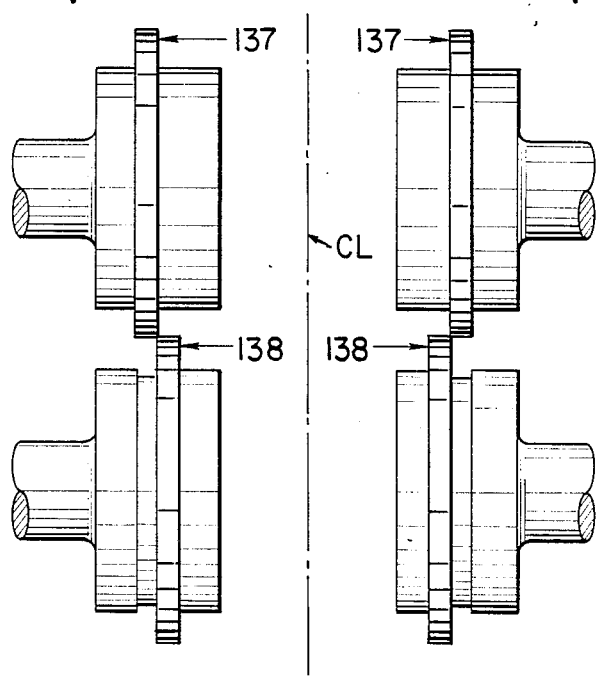
FIG. 15 is a sketch of cutting blades assembled in holder shafts.

FIG. 15 shows how the exactitude of the cutting blades are measured as assembled. The error was measured according to a same manner as the former measurement. Table 2 shows the error form an ideal plane. As is normally expected, the error is larger than the error measured in the reference surface because the inexactitude of the cutting blades and the fasteners are superposed on the error of the reference surface. But, as shown in Table 2, the deviation from the ideal plane is again extremely small, in the order of several microns, compared to the error observed in conventional apparatus that is 30 to 70 $\mu$m. This is by virtue of the present invention.

TABLE 1

| Exactitude of the reference surface as assembled | | |
|---|---|---|
| | Maximum deviation (um) | |
| Reference Surface | Case 1 | Case 2 |
| Right-side, upper holder shaft | 0.5 | 2.5 |
| Right-side, lower holder shaft | 1.5 | 5.5 |
| Left-side, upper holder shaft | 0.5 | 1.5 |
| Left-side, lower holder shaft | 0.5–1.0 | 2.5 |

TABLE 2

| Exactitude of the cutting blade as assembled | | |
|---|---|---|
| | Maximum deviation (um) | |
| Reference Blade | Case 1 | Case 2 |
| Right-side, upper cutting blade | — | 4.5 |
| Right-side, lower cutting blade | — | 5.0 |
| Left-side, upper cutting blade | — | 2.0 |

TABLE 2-continued

| Exactitude of the cutting blade as assembled | | |
|---|---|---|
| | Maximum deviation (um) | |
| Reference Blade | Case 1 | Case 2 |
| Left-side, lower cutting blade | — | 2.0 |

What is claimed is:
1. An apparatus for cutting a metal sheet, the apparatus comprising:
   (a) a pair of hollow shafts having respective axes extending in spaced parallel relation to each other, the hollow shafts being supported for angular movement about their respective axes, the hollow shafts having respective hollow bores whose respective axes are eccentric to the axes of the respective hollow shafts;
   (b) a pair of holder shafts fitted in the hollow bores of the respective hollow shafts for rotation relative thereto, the holder shafts having respective one ends projecting from the hollow shafts;
   (c) drive means associated with the other ends of the respective holder shafts for rotating the holder shafts about their respective axes;
   (d) a pair of circular cutting blades mounted on said one ends of the respective holder shafts in concentric relation thereto for rotation therewith, the cutter blades being adaptable for cooperating with each other to cut a metal sheet caused to pass therebetween;
   (e) interlocking means for angularly moving the hollow shafts about their respective axes in an interlocking fashion so as to move the respective axes of the holder shafts toward and away from each other to adjust an amount of gap between the cutting blades; and
   (f) a pair of fasteners mounted respectively to said one ends of the respective holder shafts, the forward end of each of the holder shafts being formed with a reference surface extending perpendicularly to the axis of the holder shaft, each of the fasteners having a plurality of urging means arranged along a circle concentric to the axis of a corresponding one of the holder shafts, the plurality of urging means urging one end face of the cutter blade mounted on the holder shaft to bring the other end face of the cutter blade into close contact with the holder reference surface of the holder shaft and thereby fixedly mount the cutter blade to the holder shaft, one of the fasteners including a cylindrical base in which a plurality of circular bores are formed in one end face thereof in circumferentially and equidistantly spaced relation to each other, a plurality of plungers being slidably fitted respectively in the circular bores, a plurality of coil springs being interposed under compression respectively between base end faces of the respective plungers and bottom surfaces of the respective circular bores, the plungers being biased outwardly from said circular bores under biasing forces of the respective springs so that as the one fastener threadedly engages with the forward end of the respective holder shaft, the plurality of plungers urge one end face of a fixing ring at a plurality of locations simultaneously to fix the respective cutting blade vertically in such a manner that the other end face of the respective cutting blade is brought into close contact with the reference surface of the respective holder shaft.

2. An apparatus for cutting a metal sheet according to claim 3, wherein the drive means includes;
   (a) a drive unit,
   (b) distributor means having a pair of output shafts and an input shaft drivingly connected to the drive unit, for distributing rotative driving force transmitted to the input shaft from the drive unit to the pair of output shafts such that the output shafts are rotated at equal speed, and
   (c) a pair of transmitting shafts arranged substantially in coaxial relation respectively to the holder shafts at the respective other ends, the holder shafts being drivingly connected respectively to the pair of output shafts through the respective transmitting shafts.

3. An apparatus for cutting a metal sheet according to claim 2, wherein each of the hollow shafts is supported in the housing through needle roller bearing means and thrust ball bearing means, the arrangement being such that radial load acting on the hollow shaft is born by the needle roller bearing means, while thrust load acting upon the hollow shaft is born by the thrust ball bearing means, thereby restricting an axial play of the hollow shaft.

4. An apparatus for cutting a metal sheet according to claim 3 wherein each of the pair of holder shafts is rotatably fitted in the hollow bore of the hollow shafts by at least a pair of axially spaced ball bearing means whose inner races being shrink fitted to the holder shaft and outer races being fixedly mounted to the hollow shaft.

5. An apparatus for cutting a metal sheet according to claim 2, wherein at least one of the hollow shafts is movable along said respective axis of said one hollow shaft, further comprising:
   a wedge member associated with the one hollow shaft, the wedge member being movable forward and rearward in a direction perpendicular to the axis of the one hollow shaft, the arrangement being such that when the wedge member is moved forward, the wedge member urges the one hollow shaft along said axis of said one hollow shaft to adjust a gap between the cutting blades, and
   means for urging the one hollow shaft in a direction opposite to the moving direction of the one hollow shaft at the time the wedge member is moved forwardly, thereby restricting an axial play of the one hollow shaft after completion of adjustment of the gap between the cutting blades.

6. An apparatus for cutting a metal sheet according to claim 2, wherein at least one of the hollow shafts is movable along said respective axis of said one hollow shaft, each of the holder shafts being rotatably supported in the respective hollow shafts through radial ball bearing means and thrust ball bearing means, the arrangement being such that radial load acting on the holder shaft is borne by the radial ball bearing means, while thrust load acting upon the holder shaft is borne by the thrust ball bearing means, thereby restricting an axial play of the holder shaft, further comprising:
   a wedge member associated with the one hollow shaft, the wedge member being movable forward and rearward in a direction perpendicular to the axis of the one hollow shaft, the arrangement being such that when the wedge member is moved forward, the wedge member urges the one hollow shaft along said axis of said one hollow shaft to adjust a gap between the cutting blades, and
   means for urging the one hollow shaft in a direction opposite to the moving direction of the one hollow shaft at the time the wedge member is moved forwardly, thereby restricting an axial play of the one hollow shaft after completion of adjustment of the gap between the cutting blades.

7. An apparatus for cutting a metal sheet according to claim 1, wherein each of the holder shafts is rotatably supported in the respective hollow shafts through radial ball bearing means and thrust ball bearing means, the arrangement being such that radial load acting on the holder shaft is born by the radial ball bearing means, while thrust load acting upon the holder shaft is born by the thrust ball bearing means, thereby restricting an axial play of the holder shaft.

8. An apparatus for cutting a metal sheet according to claim 7, wherein at least one of the hollow shafts is movable along said respective axis of said one hollow shaft, further comprising:
   a wedge member associated with the one hollow shaft, the wedge member being movable forward and rearward in a direction perpendicular to the axis of the one hollow shaft, the arrangement being such that when the wedge member is moved forward, the wedge member urges the one hollow shaft along said axis of said one hollow shaft to adjust a gap between the cutting blades, and
   means for urging the one hollow shaft in a direction opposite to the moving direction of the one hollow shaft at the time the wedge member is moved forwardly, thereby restricting an axial play of the one hollow shaft after completion of adjustment of the gap between the cutting blades.

9. An apparatus for cutting a metal sheet according to claim 1, wherein said drive means includes means for preventing a bending moment from being applied to said holder shaft so as to avoid deflection in said holder shafts from occurring during rotation of said holder shafts, said preventing means including means for causing said holder shafts to rotate independent of each other.

10. An apparatus for cutting a metal sheet according to claim 1, wherein said interlocking means includes means for absorbing axial displacement of at least one of said holder shafts that arises due to adjustment of said amount of gap between said cutting blades.

11. An apparatus for cutting a metal sheet according to claim 1, further comprising:
   means for supporting said hollow shafts so that radial load and thrust load acting upon said shafts are borne independently of each other to thereby eliminate a play in a direction of said thrust.

12. An apparatus for cutting a metal sheet, the apparatus comprising:
   (a) a pair of hollow shafts having respective axes extending in spaced parallel relation to each other, the hollow shafts being supported for angular movement about their respective axes, the hollow shafts having respective hollow bores whose respective axes are eccentric to the axes of the respective hollow shafts;
   (b) a pair of holder shafts fitted in the hollow ores of the respective hollow shafts for rotation relative thereto, the holder shafts having respective one ends projecting from the hollow shafts;

(c) drive means associated with the other ends of the respective holder shafts for rotating the holder shafts about their respective axes;

(d) a pair of circular cutting blades mounted on said one ends of the respective holder shafts in concentric relation thereto for rotation therewith, the cutter blades being adaptable for cooperating with each other to cut a metal sheet caused to pass therebetween; and (e) interlocking means for angularly moving the hollow shafts about their respective axes in an interlocking fashion so as to move the respective axes of the holder shafts toward and away from each other to adjust an amount of gap between the cutting blades;

(f) a pair of fasteners mounted respectively to said one ends of the respective holder shafts, the forward end of each of the holder shafts being formed with a reference surface extending perpendicularly to the axis of the holder shaft, each of the fasteners having a plurality of urging means arranged along a circle concentric to the axis of a corresponding one of the holder shafts, the plurality of urging means urging one end face of the cutter blade mounted on the holder shaft to bring the other end face of the cutter blade into close contact with the holder reference surface of the holder shaft and thereby fixedly mount the cutter blade to the holder shaft, at least one of the hollow shafts being movable along said respective axis of said one hollow shaft;

a wedge member associated with the one hollow shaft, the wedge member being movable forward and rearward in a direction perpendicular to the axis of the one hollow shaft, the arrangement being such that when the wedge member is moved forward, the wedge member urges the one hollow shaft along said axis of said one hollow shaft to adjust a gap between the cutting blades, and means for urging the one hollow shaft in a direction opposite to the moving direction of the one hollow shaft at the time the wedge member is moved forwardly, thereby restricting an axial play of the one hollow shaft after completion of adjustment of the gap between the cutting blades.

13. An apparatus for cutting a metal sheet according to claim 12, wherein said drive means includes means for preventing a bending moment from being applied to said holder shaft so as to avoid deflection in said holder shafts from occurring during rotation of said holder shafts, said preventing means including means for causing said holder shafts to rotate independent of each other.

14. An apparatus for cutting a metal sheet according to claim 12, wherein said interlocking means includes means for absorbing axial displacement of at least one of said holder shafts that arises due to adjustment of said amount of gap between said cutting blades.

15. An apparatus for cutting a metal sheet according to claim 12, further comprising:

means for supporting said hollow shafts so that radial load and thrust load acting upon said shafts are borne independently of each other to thereby eliminate a play in a direction of said thrust.

* * * * *